United States Patent [19]

Harvey et al.

[11] 3,730,737
[45] May 1, 1973

[54] COATED MOUTHPIECE CONSTRUCTION

[75] Inventors: Robert J. Harvey, Sudbury; Gurbuz Ali Celebi, Marlboro, both of Mass.

[73] Assignee: Meditron Inc., Wayland, Mass.

[22] Filed: Apr. 1, 1971

[21] Appl. No.: 130,248

[52] U.S. Cl. .................... 99/171 B, 128/252, 229/75
[51] Int. Cl. ............................................. B65b 29/06
[58] Field of Search ................... 99/171 B, 138, 77.1, 99/171 R, 78, 180; 229/75; 215/1 A; 128/252; 239/33

[56] References Cited

UNITED STATES PATENTS

| | | | |
|---|---|---|---|
| 3,620,770 | 11/1971 | Harvey | 99/171 B |
| 3,165,241 | 1/1965 | Curry | 128/252 X |
| 1,012,193 | 12/1911 | Deffner | 239/33 |
| 3,426,755 | 2/1969 | Clegg | 128/252 |
| 3,610,248 | 10/1971 | Davidson | 128/252 X |
| 3,255,691 | 6/1966 | Schwartz et al. | 99/77.1 X |
| 2,102,920 | 12/1937 | Savage | 99/77.1 UX |
| 3,463,361 | 8/1969 | Cook et al. | 239/33 X |

OTHER PUBLICATIONS

Journal of Agricultural & Food Chemistry, Vol. 13, No. 3 1965 pp. 284–287.

*Primary Examiner*—Frank W. Lutter
*Assistant Examiner*—Steven L. Weinstein
*Attorney*—Kenway, Jenney & Hildreth

[57] ABSTRACT

A mouthpiece construction having a tip and a mouthpiece adapted to fit with a straw. The tip is coated with an effervescent taste-modifying composition comprising an effective amount of room temperature stable taste modifying principle known as miraculin obtained from the ripe fruit of *Synsepalum dulcificum* Daniell, and a non-toxic alkaline material capable of forming carbon dioxide when dissolved in an aqueous acidic solution. The coating is sealed from the atmosphere and the interior of the mouthpiece. The mouthpiece has a lengthwise passageway which fits with the interior of a straw and radial passageway which connects the lengthwise passageway and the peripheral surface of the mouthpiece. The radial passageways are positioned so that liquid passing out of them contacts the coating.

28 Claims, 4 Drawing Figures

PATENTED MAY 1 1973
3,730,737
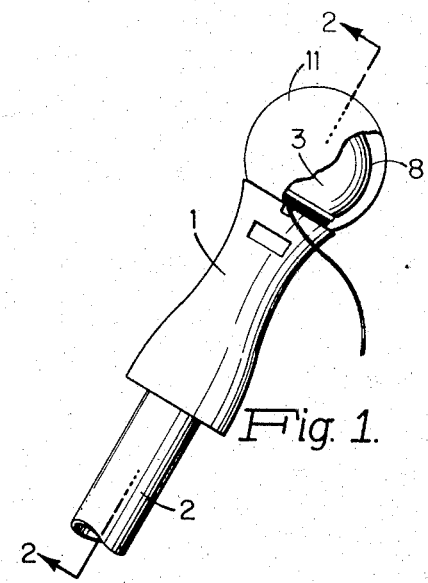
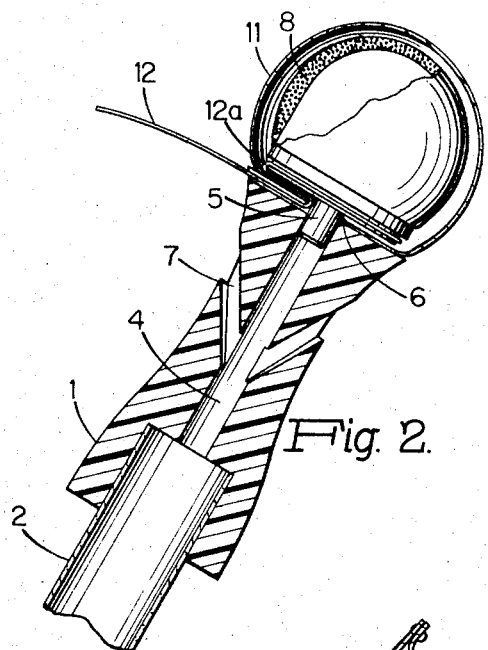
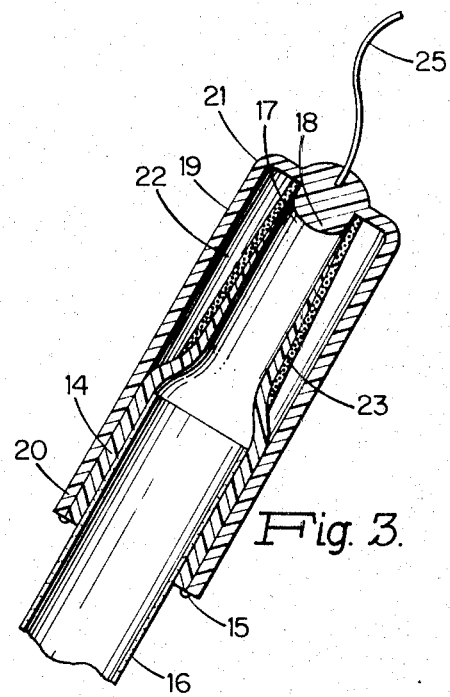
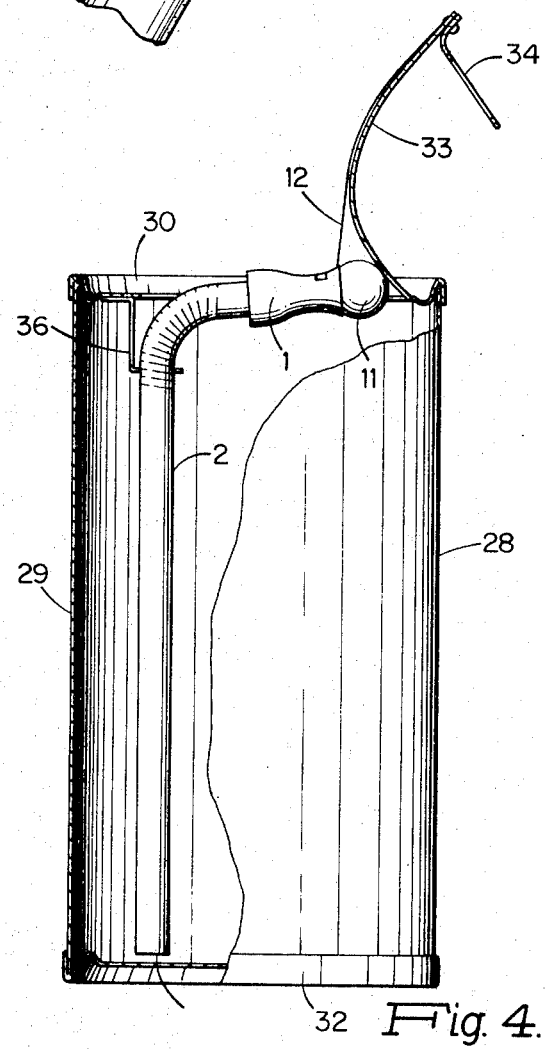
INVENTORS
ROBERT J. HARVEY
GURBUZ A. CELEBI
BY
Kenway, Jenney & Hildreth
ATTORNEYS

COATED MOUTHPIECE CONSTRUCTION

This invention relates to a mouthpiece coated with a miraculin composition useful for modifying the taste receptors to render sour tasting liquids sweet tasting.

*Synsepalum dulcificum* Daniell, Sapotaceae is a plant indigenous to West-Central Africa which bears a red ellipsoid fruit commonly known as "miracle fruit". The fruit has a palatable pulp and skin and contains a large seed. It is characterized by a pleasant taste and by the unique property, well-recognized for over 200 years, of modifying the sweet and sour tastes in an unusual manner. It has been found that a component in the fruit depresses the sour taste and accentuates the sweet taste of any normally sour food eaten within a short period after first contacting the tongue with the pulp of fresh miracle fruit, thus causing the normally sour food taste pleasantly sweet. By exposing the taste receptors on the tongue to miracle fruit, any sour tasting food can be made to taste sweet without the addition of sugar or artificial sweeteners. For example, fresh lemon can be made to taste pleasantly sweet by first eating a miracle fruit berry. The taste-modifying principle known as miraculin found in the miracle fruit berry binds itself to the taste receptors thus altering the sensory perception of the sour taste in foods eaten after the miracle fruit.

The prior art has regarded miraculin as a very labile material accounting for the observed instability of concentrates maintained at normal room temperatures. While some degree of success has been attained in improving stability of miraculin-containing material in the order of about a week or so, it has been found that stability could not be achieved when maintained in powder form at room temperatures. Alternatively, the miraculin-containing material was dissolved in specific solvents maintained at a specific pH. These solutions had to be refrigerated to be preserved, and even then this material was not as effective as the natural fruit. However, a novel powdered form of the glycoprotein active principle from miracle fruit which is stable for long periods of time of a year or more at normal room condition and its method of preparation is disclosed in a commonly owned application Ser. No. 28,981 filed Apr. 15, 1970, in the names of Robert J. Harvey and J. Richard Fennell now U.S. Pat. No. 3,676,149 issued July 11, 1972 and entitled "Taste Modifying Composition and Method of Preparation".

In accordance with the process of the invention disclosed in the above-identified co-pending application, a stable miraculin-rich composition is obtained by comminuting depitted ripe miracle fruit containing miraculin and then separating the vaporous and liquid components including acids and enzymatic components of the ripe fruit that degrade miraculin from the miraculin-rich material. The liquid and vaporous components are separated by dehydration and the enzymatic components are separated by any means that effects separation on the basis of density.

To minimize miraculin loss after picking, the whole fruit can be frozen to very low temperatures to await processing or the pulp and skin can be processed immediately after picking to obtain the concentrated miraculin. Comminution of the fruit serves to fracture the cell walls and thereby expose substantially all of the miraculin and facilitate subsequent processing. Dehydration can be effected in any convenient manner wherein low temperatures can be obtained including lyophilization, foam separation, spray drying or similar dehydration processes and can preceed or follow the separation step based on density. It is preferred to separate the high density miraculin from the low density enzyme-rich material following dehydration because of the increased efficiencies obtained thereby. If the miraculin is not separated from the material containing the enzyme, the product is unstable and will be degraded quickly at normal room conditions so that it loses its taste-modifying effect. The miraculin-rich material, substantially free of the degrading enzyme and/or acids, has a substantially higher density than the material containing the enzyme. Therefore, the separation of the miraculin, that may contain some cellulosic material, from material containing the enzyme is effected by processes that separate materials on a density basis. To facilitate this separation, the mixed pulp and miraculin is preliminarily comminuted and screened to obtain uniformly small particle size.

The preferred process of the invention disclosed in the above-identified co-pending application is based upon the discovery that degradation of miraculin in the fruit is initiated immediately after the ripe fruit is picked, and that degradation of the active principle in its natural environment is accelerated by increased temperature and by contact with air. Thus, it is preferred to process the ripe miracle fruit as quickly as possible, at as low temperature as possible, and in as non-oxidizing atmosphere, to obtain a high yield of miraculin. Preferably, the picked fruit is washed in water and then depitted at about 1° to 4°C. The fruit can be stored in a frozen state to await processing or can be processed immediately to obtain the active principle. When stored, temperatures of about −40°C. or less are employed to arrest degradation since it has been found that degradation of the active principle in the frozen fruit occurs even when stored at temperatures of about −15°C. Since it is difficult to remove the pit or seed from the frozen berry, it is preferred to depit the berry prior to frozen storage. The depitted berry, regardless of whether it has been stored previously or whether it is processed directly after having been picked, is comminuted in a frozen state either alone or together with dry ice or ice formed from pyrogen-free distilled water. When the berry is processed immediately after having been picked, the pulp and skin obtained from the depitting step are directed into a container placed in a low temperature bath which itself may contain crushed dry ice. The pulp and skin are then comminuted at low temperatures such as by blending, grinding or ball-milling with ball milling in a shell freezer being preferred.

The separation of the miraculin-rich material from the enzyme-rich material is based upon the fact that the active principle is considerably more dense than the enzyme-rich material in the order of about 10 times as dense. Thus, the mixture of inerts and active material described above can be separated by any convenient density separation method including settling from a suspension of the mixture in liquid, the use of fluidizing bed technique, or through the use of cyclone type centrifuge. Some separation of miraculin-rich material from enzyme-rich material can be effected prior to dehydration by placing the comminuted pulp in settling pans at a temperature of 1°–4°C. until the highest density material has settled in the bottom. The settling is complete in a short period of about 20 minutes with the miraculin-rich material forming the lowest layer which is then separated. The material then is frozen to below about −40°C. and dehydrated. The preferred separation method is conducted after dehydration and utilizes a cyclone type centrifuge for dry powder following dehydration described in the examples. The miraculin-rich material has a density in excess of 1 g/cc while the enzyme-rich cellulosic material has a density of less than about 0.5g/cc since the high density material is white and the low density material is brown the separate layers can be easily and quickly identified on the basis of color. To obtain the desired product stability, enzyme-rich material concentration should be as low as possible with removal in the order of about 95 percent having been found to be adequate.

The product disclosed in the copending application is a stable powder comprising miraculin, either alone or admixed with material inert with respect to the characteristic of suppressing sour taste but excluding components that degrade miraculin present in the pulp and skin or miracle fruit including the material containing acids and/or enzymes that degrade miraculin. The product exhibits remarkable stability in powdered form at room temperature. This is indeed surprising in view of the prior art which regarded miraculin to be highly unstable and thermolabile such that it was thought necessary to maintain powdered concentrates in a frozen condition or in a dry atmosphere or to refrigerate solutions of the active principle obtained by the prior art processes to retain the desired stability over reasonably long periods of time.

When it is desired to improve the taste of acidic solutions, such as carbonated beverages or fruit juices, with miraculin, the miraculin is administered prior to or contemporaneous with the beverage. It is desirable that the miraculin be administered contemporaneously with the acidic liquid to provide improved convenience. However, this requires that the miraculin become effective prior to or immediately upon the beverage's contacting the taste receptors on the tongue. Tests have shown that this is best accomplished by providing a miraculin coating which is capable of effervescing when contacted by an acidic aqueous solution. Since sour beverages are acidic aqueous solutions, the beverage can act as the means of generating the effervescences which in turn very quickly releases the fine particle of miraculin in the coating which immediately becomes effective in modifying the sour taste of the acidic beverage. The miraculin coating must contain an alkaline material capable of effervescing when it is desired to obtain such a coating, but does not need to contain the acid. This greatly simplifies the procedure for mixing and applying the coating and reduces the manufacturing costs appreciably since water can be used as a solvent instead of alcohol to form a slurry, and the operations need not be carried out in a dry atmosphere.

In accordance with this invention there is provided a mouthpiece coated with a composition containing stable taste-modifying miraculin on the outside surface at the end inserted in the mouth during use. The coated composition is sealed from the outside atmosphere and from the interior of the mouthpiece. During use, the seal is broken and the liquid entering a straw associated with the mouthpiece and the mouthpiece contacts the miraculin and becomes a carrier for the miraculin to bring it into the mouth. While in the mouth, the miraculin modifies the taste receptors as described above so that subsequent acidic liquid is made to taste pleasantly sweet.

In one configuration, the mouthpiece of a tubular straw is coated at one end on the outside surface and sealed from the atmosphere and liquid by inserting a sealed plug into the end of the straw and providing a sealed covering on the exposed miraculin. In another configuration, miraculin is coated on an extension that can be inserted and sealed into one end of the mouthpiece of a straw. The mouthpiece on the straw can be designed so that the liquid entering the straw can exit the ports in the wall of the mouthpiece which are located just downstream of the coated miraculin. The liquid exiting the ports then functions as a carrier for the miraculin to the tongue.

This invention will be more fully described with reference to the accompanying drawings.

FIG. 1 is a top view, in partial cross section of a mouthpiece that can be used in this invention.

FIG. 2 shows the mouthpiece of FIG. 1 taken along line 2—2.

FIG. 3 shows an alternative straw-mouthpiece construction.

FIG. 4 is a view in partial cross-section showing the structure of FIG. 1 in a can having a removable top.

Referring to FIGS. 1 and 2, a mouthpiece 1 is inserted over a straw 2 at one end and a tip 3 is inserted into the other end of the lengthwise passageway 4 of the mouthpiece 1. The extension 5 of tip 3 is sealed to the mouthpiece 1 by means of an adhesive ring 6. The mouthpiece 1 is provided with a plurality of radial passages 7 which communicate between lengthwise passageways 4 and the outside surface of mouthpiece 1. Thus, when liquid is injected from the straw 2 into the passageway 4 and out the passageways 7, the liquid will pass over the outside surface of tip 3. Tip 3 has a coating 8 comprising a miraculin composition. The miraculin composition 8 is sealed from the outside atmosphere by means of a cover 11 which is sealed around the circumference of extension 5 by means of sealing ring 6. A string 12 which is wrapped around the extension 5 also is contained within cover 11. In using the construction shown in FIGS. 1 and 2, the string 12 is pulled to unravel the would string 12a thereby tearing the cover 11. The exposed tip 3 then is inserted into the mouth in contact with the tongue and suction is applied to the mouthpiece 1 so that liquid exiting passageways 7 passes over the miraculin coating 8 so that it carries the miraculin coating 8 onto the tongue.

It is to be understood that only one radial passageway need be employed but that more effective contact of liquid and coating is attained with a plurality of radial passageways, preferably two radial passageways. In addition it is to be understood that the mouthpiece and tip can comprise a unitary construction with the sealing film arranged to seal the coating from the radial passageways and the atmosphere.

Referring to FIG. 3, the mouthpiece 14 has a generally tubular shape with one end 15 being adapted to fit over straw 16 and the other end 17 being adapted to have a seal 18 fit therein. A cover 19 is provided which is sealed at one end 20 to the mouthpiece 14 and at the other end 21 to the seal 18. By having the mouthpiece 14 tapered as shown, a space 22 is formed between the cover 19 and the mouthpiece 14. This permits a miraculin coating 23 to be applied to the outside surface of the mouthpiece 14 so that when the cover 19 is removed, the miraculin coating can contact the tongue during use. The seal 18 has a string 25 attached thereto to provide means for removing the cover 19 and the seal 18 from contact with the mouthpiece.

Referring to FIG. 4, a can 28 having side walls 29 a top 30 and a bottom 32 has a straw 2 inserted therein. The straw 2 has a mouthpiece 1 sealed thereon in the manner described above. The string 12 is attached to the mouthpiece 1 and also is attached to the tab portion 33 of the can 28. A ring 34 is riveted to the tab 33 and provides convenient means for pulling the tab. When the tab 33 is pulled, the string 12 also is pulled and the cover 11 is removed from the tip 1. The tab 33 is formed in the can 28 by scoring in a manner well known in the art. The straw 2 is retained stationary in the can 28 by means of a flange 36.

In a preferred embodiment of this invention, the coating comprises a composition capable of becoming effervescent and containing stable miraculin. The composition comprises stable miraculin and either an alkaline material that evolves carbon dioxide when dissolved in an aqueous acidic solution or a mixture of such an alkaline material and an organic acid which mixture reacts to form carbon dioxide when dissolved in water. When the miraculin composition is made effervescent, the degree and speed of contact of miraculin and the taste receptors on the tongue is greatly improved. Thus, the liquid to be drunk effects improved contact by virtue of its flow velocity when exiting from the mouthpiece and by virtue of the reaction it causes when contact is made with the effervescent miraculin coating.

The shape and size of the mouthpiece shown in FIG. 2 is preferred since it permits the taste-modifying effect of the miraculin to take effect immediately when the first sip of beverage emerges from the passageways, 7. Referring to FIG. 2, one notes that the straw must naturally and conveniently match the lip-tongue arrangement so that: the lips close around the mouthpiece between the straw and the side passageways, 7; the lips do not block the side passageways, 7; the coated tip of the mouthpiece lie on the tip of the tongue so that the beverage emerging from the side passageways, 7 deposit the effervescing coating directly on the tip and sides of the tongue where the sweet and sour taste receptors are located.

Suitable alkaline materials are those which do not adversely affect the taste modifying characteristics of miraculin and form carbon dioxide upon contact with water and an acid. Suitable non-toxic alkaline materials that can be employed herein include magnesium carbonate, sodium bicarbonate, calcium carbonate, or mixtures thereof. Usually the alkaline material is employed in amounts of between 10 and 15 milligrams per straw while the miraculin is employed in amounts of between 5 and 60 milligrams per straw.

The source of the water needed for the reaction is the liquid being drunk after the mouthpiece coated with the effervescent composition containing miraculin is placed on the tongue. The acid can be either incorporated in the effervescent composition or form part of the liquid being drunk. For example, carbonated liquids contain carbonic acid which will react with sodium bicarbonate and water to form carbon dioxide. Thus, in this example, it would not be necessary to incorporate an acid when employing sodium bicarbonate in the miraculin-containing composition. On the other hand, when the liquid being drunk contains little or no acid, the acidic component can be incorporated into the miraculin-containing composition. The acid employed in the miraculin-containing composition is a non-toxic organic acid that does not degrade the miraculin when dry. Suitable organic acids include, ascorbic acid, citric acid, fumaric acid or adidic acid. The effervescent alkaline of alkaline plus acid material is employed in amounts of between 5 and 50 percent by weight. Less than 5 percent by weight results in little or no effective effervescense while above 50 percent by weight results in an undesirable tactile effect on the tongue and an undesirable salty taste. The binder can comprise about 5 to 25 weight percent. The miraculin comprises the remainder of the effervescent composition, preferably about 55 to 65 weight percent.

This invention provides a number of important advantages. The use of an effervescent coating on the tip provides a means for effectively disposing miraculin so that an otherwise sour beverage will taste sweet. The utilization of the acid in the liquid being drunk rather than incorporating the acid in the effervescent coating provides substantial advantages in manufacturing since water can be used as the dispersant in the coating step rather than an organic solvent. If water were employed with the acid-alkaline effervescent composition, the effervescent reaction would be premature. In addition, with the acid-alkaline containing effervescent compositions, care must be made to maintain the surrounding atmosphere dry during manufacture.

Any generally employed straw materials and constructions are useful in the present invention including plastics such as polyethylene or polypropylene and wax-coated paper.

The following examples illustrate the present invention and are not intended to limit the same.

Example I

An effervescent miraculin composition was prepared by first forming a slurry of ascorbic acid and sodium bicarbonate in the following proportion:

TABLE I

| Composition A | |
|---|---|
| Ascorbic Acid | 176.12 grams (1 mole) |
| Sodium Bicarbonate | 168.04 grams (2 moles) |

Composition A was mixed with dry ethyl alcohol. The resultant slurry was admixed with 646 grams stable miraculin prepared in the manner disclosed in copending application Ser. No. 28,981, referred to above, and 58 grams of a binder comprising Maltrin-10 which is essentially a starch. After the components were thoroughly mixed, the alcohol was evaporated by heating the resultant mixture to a temperature to about 50°C. The resultant composition was then applied to a straw tip in an amount between about 80 and about 150 milligrams.

Example II

An effervescent coating for use with an acid-containing liquid is prepared by admixing an aqueous solution of 15 wt. percent sodium bicarbonate with 65 wt. percent stable miraculin and 20 wt. percent of a binder comprising Maltrin-10. After being thoroughly mixed, the water was evaporated by heating the resultant mixture to a temperature to about 50°–60°C.

We claim:

1. A mouthpiece construction comprising a mouthpiece tip adapted to permit its placement on the tongue, said tip being coated with a composition capable of becoming effervescent and for modifying the taste receptors of the tongue to render normally sour-tasting foods sweet-tasting comprising an effective amount of room-temperature stable taste-modifying principle obtained from the ripe fruit of *Synsepalum dulcificum* Daniell, a binder and between about 5 and 50 weight percent of an effervescent material comprising a non-toxic alkaline material capable of forming carbon dioxide when dissolved in an acidic aqueous solution, said coating being sealed from the atmosphere with a removable sheet material, said tip being sealed to a mouthpiece adapted to fit in the mouth and having a lengthwise passageway through the mouthpiece, one end of said lengthwise passageway being adapted to fit with an end of a straw and at least one radial passageway connecting said lengthwise passageway and the peripheral surface of said mouthpiece.

2. The construction of claim 1 having two oppositely disposed radial passageways.

3. The construction of claim 1 having means for tearing said sheet material prior to use.

4. The construction of claim 3 having two oppositely disposed radial passageways.

5. The construction of claim 1 wherein the mouthpiece peripheral surface is concave to accommodate the lips during use and the length of the concave surface and the coated tip is such as to place the coated surface on the sour and sweet taste receptors of the tongue during use.

6. The construction of claim 5 having two oppositely disposed radial passageways.

7. The construction of claim 5 having means for tearing said sheet material prior to use.

8. The construction of claim 7 having two oppositely disposed radial passageways.

9. A mouthpiece construction comprising a mouthpiece tip adapted to permit its placement on the tongue, said tip being coated with a composition capable of becoming effervescent and for modifying the taste receptors of the tongue to render normally sour-tasting foods sweet-tasting comprising an effective amount of room-temperature stable taste-modifying principle obtained from the ripe fruit of *Synsepalum dulcificum* Daniell, a binder and between about 5 and 50 weight percent of an effervescent material comprising a non-toxic alkaline material and a non-toxic organic acid, said alkaline material and said acid capable of reacting to form carbon dioxide when in aqueous solution, said coating being sealed from the atmosphere with a removable sheet material, said tip being sealed to a mouthpiece adapted to fit in the mouth and having a lengthwise passageway through the mouthpiece, one end of said lengthwise passageway being adapted to fit with an end of a straw and at least one radial passageway connecting said lengthwise passageway and the peripheral surface of said mouthpiece.

10. The construction of claim 9 having two oppositely disposed radial passageways.

11. The construction of claim 9 having means for tearing said sheet material prior to use.

12. The construction of claim 11 having two oppositely disposed radial passageways.

13. The construction of claim 9 wherein the mouthpiece peripheral surface is concave to accommodate the lips during use and the length of the concave surface and the coated tip is such as to place the coated surface on the sour and sweet taste receptors of the tongue during use.

14. The construction of claim 13 having means for tearing said sheet material prior to use.

15. The construction of claim 13 having two oppositely disposed radial passageways.

16. A mouthpiece construction comprising a mouthpiece tip adapted to permit its placement on the tongue, said tip being coated with a composition for modifying the taste receptors of the tongue to render normally sour-tasting foods sweet-tasting comprising an effective amount of room-temperature stable taste-modifying principle obtained from the ripe fruit of *Synsepalum dulcificum* Daniell, and a binder, said coating being sealed from the atmosphere with a removable sheet material, said tip being sealed to a mouthpiece adapted to fit in the mouth and having a lengthwise passageway through the mouthpiece, one end of said lengthwise passageway being adapted to fit with an end of a straw and at least one radial passageway connecting said lengthwise passageway and the peripheral surface of said mouthpiece.

17. The construction of claim 16 wherein the mouthpiece peripheral surface is concave to accommodate the lips during use and the length of the concave surface and the coated tip is such as to place the coated surface on the sour and sweet taste receptors of the tongue during use.

18. The construction of claim 16 having means for tearing said sheet material prior to use.

19. The construction of claim 16 having two oppositely disposed radial passageways.

20. A mouthpiece of unitary construction comprising a tip adapted to permit its placement on the tongue, said tip being coated with a composition for modifying the taste receptors of the tongue to render normally sour-tasting foods sweet-tasting comprising an effective amount of room-temperature stable taste-modifying principle obtained from the ripe fruit of *Synsepalum dulcificum* Daniell, and a binder, said coating being sealed from the atmosphere with a removable sheet material, and a mouthpiece integral with said tip, said mouthpiece adapted to fit in the mouth and having a lengthwise passageway, one end of said lengthwise passageway being adapted to fit with an end of a straw and at least one radial passageway connecting said lengthwise passageway and the peripheral surface of said mouthpiece.

21. The construction of claim 20 having means for tearing said sheet material prior to use.

22. The construction of claim 20 wherein the mouthpiece peripheral surface is concave to accommodate the lips during use and the length of the concave surface and the coated tip is such as to place the coated surface on the sour and sweet taste receptors of the tongue during use.

23. The construction of claim 22 having means for tearing said sheet material prior to use.

24. A mouthpiece of unitary construction comprising a tip adapted to permit its placement on the tongue, said tip being coated with a composition capable of becoming effervescent and for modifying the taste receptors of the tongue to render noramlly sour-tasting food sweet-tasting comprising an effective amount of room-temperature stable taste-modifying principle obtained from the ripe fruit of *Synsepalum dulcificum* Daniell, a binder and between about 5 and 50 weight percent of an effervescent material comprising a non-toxic alkaline material capable of forming carbon dioxide when dissolved in an acidic aqueous solution, said coating being sealed from the atmosphere with a removable sheet material, and a mouthpiece integral with said tip, said mouthpiece adapted to fit in the mouth and having a lengthwise passageway, one end of said lengthwise passageway being adapted to fit with an end of a straw and at least one radial passageway connecting said lengthwise passageway and the peripheral surface of said mouthpiece.

25. The construction of claim 24 having means for tearing said sheet material prior to use.

26. The construction of claim 24 wherein the mouthpiece peripheral surface is concave to accommodate the lips during use and the length of the concave surface and the coated tip is such as to place the coated surface on the sour and sweet taste receptors of the tongue during use.

27. The construction of claim 26 having means for tearing said sheet material prior to use.

28. A mouthpiece of unitary construction comprising a tip adapted to permit its placement on the tongue, said tip being coated with a composition capable of becoming effervescent and for modifying the taste receptors of the tongue to render normally sour-tasting foods sweet-tasting comprising an effective amount of room-temperature stable taste-modifying principle obtained from the ripe fruit of *Synsepalum dulcificum* Daniell and between about 5 and 50 weight percent of an effervescent material comprising a non-toxic alkaline material and a non-toxic organic acid, said alkaline material and said acid capable of reacting to form carbon dioxide when in aqueous solution, and a mouthpiece integral with said tip, said mouthpiece adapted to fit in the mouth and having a lengthwise passageway, one end of said lengthwise passageway being adapted to fit with an end of a straw and at least one radial passageway connecting said lengthwise passageway and the peripheral surface of said mouthpiece.

* * * * *